United States Patent [19]

Fritsch et al.

[11] Patent Number: 4,868,700
[45] Date of Patent: Sep. 19, 1989

[54] CLEANING DEVICE FOR DISC DRIVE UNIT

[75] Inventors: Joseph F. Fritsch, 114 Lansdowne Park, Dublin; Alexander McDonnell, Celbridge, both of Ireland

[73] Assignees: Joseph F. Fritsch; Roxanne Y. Fritsch, both of Dublin, Ireland

[21] Appl. No.: 116,888

[22] Filed: Nov. 5, 1987

[51] Int. Cl.⁴ .............................................. G11B 5/41
[52] U.S. Cl. ................................. 360/128; 360/97.04; 360/137
[58] Field of Search ............... 360/128, 97, 137, 97.04

[56] References Cited
U.S. PATENT DOCUMENTS

2,992,447 7/1961 Hicks .............................. 360/128 X
4,498,114 2/1985 Davis ................................. 360/128
4,622,617 11/1986 Fritsch ............................... 360/128

Primary Examiner—A. J. Heinz
Attorney, Agent, or Firm—Sughrue, Mion, Zinn, Macpeak and Seas

[57] ABSTRACT

A cleaning device for cleaning a read/write head of a floppy disc drive unit comprises a plate member for insertion in the floppy disc receiving area. A cleaning member formed by a backing material with a plurality of upstanding tufts of fibres to clean the read/write head is provided in recesses on front and back surfaces of the plate member. Cleaning members are provided in recesses of the plate member to clean guide rails in the floppy disc receiving area.

13 Claims, 4 Drawing Sheets

CLEANING DEVICE FOR DISC DRIVE UNIT

FIELD OF THE INVENTION

The present invention relates to a cleaning device for cleaning a read/write and/or recording/playback head of a disc drive unit, for example, a floppy disc drive unit, a hard disc drive unit, a compact disc drive unit or the like. It also relates to a cleaning device for cleaning components of an audio, video, data and other magnetic recording and/or playback apparatus, such as, for example, the guide rails in a cassette type audio or video recorder/playback unit, or indeed, any other components in such a unit.

BACKGROUND TO THE INVENTION

In disc drive units, in particular floppy disc drive units, it is essential that the read/write head should be cleaned regularly. Dust and dirt particles on the floppy disc tend to collect and build-up on the read/write head over time. Cleaning devices for cleaning the read/write head have been proposed in the past. In general, such devices comprise an envelope similar to a floppy disc envelope, and a disc of cleaning material, usually a non-woven cloth material is rotatably mounted within the envelope. The cleaning disc, in shape and size is similar to the media disc of a standard floppy disc. A window similar to the window in the envelope of a floppy disc is provided to provide access of the read/write head to the cleaning material.

Accordingly, on mounting the cleaning device in the floppy disc receiving area of the disc drive unit, the cleaning disc is rotated by the drive spindle in similar fashion as the media disc is rotated. The read/write head is then brought into contact with the cleaning disc for cleaning the head. Unfortunately, it has been found that such devices do not adequately clean the read/write head. Firstly, the cleaning material because it has to be rotatable within the envelope of the floppy disc is a relatively rigid type material. It is thus unsuitable for cleaning. Usually, it is manufactured by bonding threads with a resin which provides a relatively stiff material with a poor ability to clean. This is largely because the cleaning material being relatively stiff is unable to follow the contours of the read/write head. Thus, only the specific surfaces of the read/write head which come in direct contact with the cleaning material are cleaned. In practice, it has been found that most read/write heads do not offer a smooth surface to the cleaning material. In general, the surface of read/write heads tends to be uneven, usually comprising a plurality of ridges and slots. Dirt and dust particles tend to collect in the slots and these are inaccessible to the cleaning material. Thus, they remain uncleaned. This has a particular disadvantageous effect, in that in due course, when the dirt deposits build up to a sufficent level, the dirt dislodges from the slot and falls onto the media disc. This, it will be appreciated, considerably reduces the quality of writing or reading onto or from the media disc, and in certain extreme cases, can actually cause damage to the media disc.

A second problem is that because the cleaning material, although relatively rigid, is a cloth material and usually non-woven, if it is subjected to any pressure from the read/write head, portion of the material can become entangled with the head and thus the cleaning material is damaged. Indeed, in certain extreme cases, the actual read/write head may also be damaged.

There is therefore a need for a cleaning device for a read/write head of a floppy disc drive unit which overcomes the problems of known cleaning devices. Further, there is a need for a cleaning device which is suitable for other disc drive units. Indeed, in floppy disc drive units, and indeed, any other magnetic data recording or playback devices, including audio and video apparatus, an area where dirt can collect is on the guide rails which guide the disc, floppy disc, cassette or the like into the apparatus. There is no suitable known device which cleans these rails. There is therefore also a need for providing such a cleaning device.

OBJECTS OF THE INVENTION

One object of the invention is to provide a cleaning device which cleans the read/write head of a floppy disc drive unit relatively effectively. There is also a need to provide a cleaning device which cleans the read/write head, or the recording/playback head of any disc drive unit, for example, a compact disc drive unit or the like. A further object of the invention is to provide a cleaning device which cleans the guide rails of a floppy disc drive unit relatively effectively. A further object of the invention is to provide a cleaning device which cleans the guide rails of any magnetic data recording/playback unit, such as, for example, an audio recorder/playback unit or a video recorder/playback unit.

SUMMARY OF THE INVENTION

According to the invention, there is provided a cleaning device for a read/write or recording/playback head of a disc drive unit, the cleaning device comprising a plate member for engagement in a disc receiving area of the disc drive unit, the plate member having a front and rear surface, and cleaning means for cleaning the head mounted on at least one surface of the plate member. Preferably, the cleaning means is provided by a plurality of upstanding fibres. Advantageously, the fibres are woven into a backing material.

In one embodiment of the invention, the fibres are provided in tufts with 50 to 75 fibres per tuft, and preferably there are 250 to 350 tufts per square centimetre. In another embodiment of the invention, the length of the fibres is in the range of 1.0 to 2.1mm and the diameter of the fibres is in the range of 15 to 25 microns.

In another embodiment of the invention, a recess is provided in the plate member to receive the cleaning means. In a further embodiment of the invention, an opening is provided in the plate member to co-incide, in use, with a drive spindle of the disc drive unit, and preferably the cleaning means is an elongated cleaning member extending radially relative to the opening towards a side edge of the plate member to form a cleaning path for the head.

In a further embodiment of the invention, recesses to receive cleaning means are provided on both surfaces of the plate member, the recesses extending from an end edge of the plate member, the cleaning means extending from an inward end of the recess on one side around the end edge to a corresponding inward end of the recess on the other side.

In a still further embodiment of the invention, an annular disc is rotatable in the plate member in an annular recess extending into the plate member from the opening thereof, the annular disc extending into the opening and being engagable, in use, with a drive spindle of the disc drive unit, an opening being provided in the annular disc to permit light to pass from a light source to a light sensor within the disc drive unit as the opening aligns with the source and sensor. Preferably, the annular recess is defined by a plurality of staggered lugs extending from the plate member into the opening of the plate member.

Advantageously, the plate member defines the outer periphery of a floppy disc envelope.

Additionally, the invention provides a cleaning device for cleaning a read/write or recording/playback head of a disc drive unit, the cleaning device comprising a carrier member for engaging in a disc receiving area of the disc drive unit, and a cleaning means mounted in or on the carrier member to clean the head, the cleaning means comprising a plurality of upstanding fibres.

Further, the invention provides a cleaning device for cleaning components of an audio, video, data and/or other magnetic recording and/or playback apparatus, the device comprising a carrier member for engaging in a cassette receiving area of the apparatus, cleaning means on the carrier member to clean guide rails in the cassette receiving area as the carrier member is being engaged in the cassette receiving area. Preferably, the carrier member comprises a front and rear surface, the cleaning means being provided on at least one surface adjacent opposite side edges thereof.

Additionally, the invention provides a method for cleaning a read/write head of a disc drive unit with the cleaning device of the invention in the disc receiving area of the disc drive unit, the method comprising the steps of moving the read/write head over the cleaning means of the cleaning device under the control of a computer programme, and returning the read/write head to the outer track position.

ADVANTAGES OF THE INVENTION

The advantages of the invention are many. One particularly important advantage of the invention is that it provides a cleaning device which is relatively effective in cleaning the read/write head of a floppy disc drive unit. A further advantage of the invention is that the cleaning device can clean read/write heads which present a relatively uneven surface to the cleaning media of the cleaning device. This is a particularly important advantage in that most read/write heads now tend to present a surface which includes a number of slots and ridges to the cleaning device. Where the cleaning means comprises a plurality of fibres, relatively effective cleaning of such uneven surfaces is achieved.

A further important advantage of the invention is that the device is a relatively inexpensive device to manufacture and assemble, and furthermore, the device itself is a relatively inexpensive device. Indeed, a further advantage of the invention is the fact that it provides a device which is relatively simple and easy to use and operate.

Another relatively important advantage of the invention is the fact that the guide rails of the floppy disc drive unit are relatively effectively cleaned by the device as it is being engaged in the floppy disc receiving area. This is achieved when cleaning means are provided on each side of the plate member or carrier member to wipe over the guide rails as the device is being entered in the floppy disc receiving area. Indeed, where the device is adapted for use in other magnetic data recording/playback apparatus, for example, a compact disc drive unit, an audio cassette recorder/player, a video recorder/player and the like relatively effective cleaning of the guide rails is also achieved.

These objects and advantages will be readily apparent from the following description of some preferred embodiments thereof, given by way of example only, with reference to the accompanying drawings.

DETAILED DESCRIPTION OF THE DRAWINGS

Referring to the drawings, and initially to FIGS. 1 to 4 there is illustrated a cleaning device according to the invention indicated generally by the reference numeral 1 for cleaning the read/write head of a floppy disc drive unit. The disc drive unit is not illustrated. However, such disc drive units will be well known to those skilled in the art. The device 1 comprises a carrier member which in this case is provided by a plate member 2 formed in one piece of injection moulded plastics material. The outer dimensions of the plate member are similar to the outer dimensions of a conventional floppy disc envelope, and accordingly, the device 1 is engagable in the floppy disc receiving area of the disc drive unit. In fact, it will be appreciated that devices 1 with plate members of different peripheral dimensions will be provided for cleaning the read/write head in disc drive units which accommodate different sizes of floppy discs. An opening 4 is provided in the plate member 2 which, in use, corresponds with the drive spindle of the disc drive unit. A rotatable annular disc 6 is provided in the opening 4 and this is described in more detail below.

Figures 1, 3:
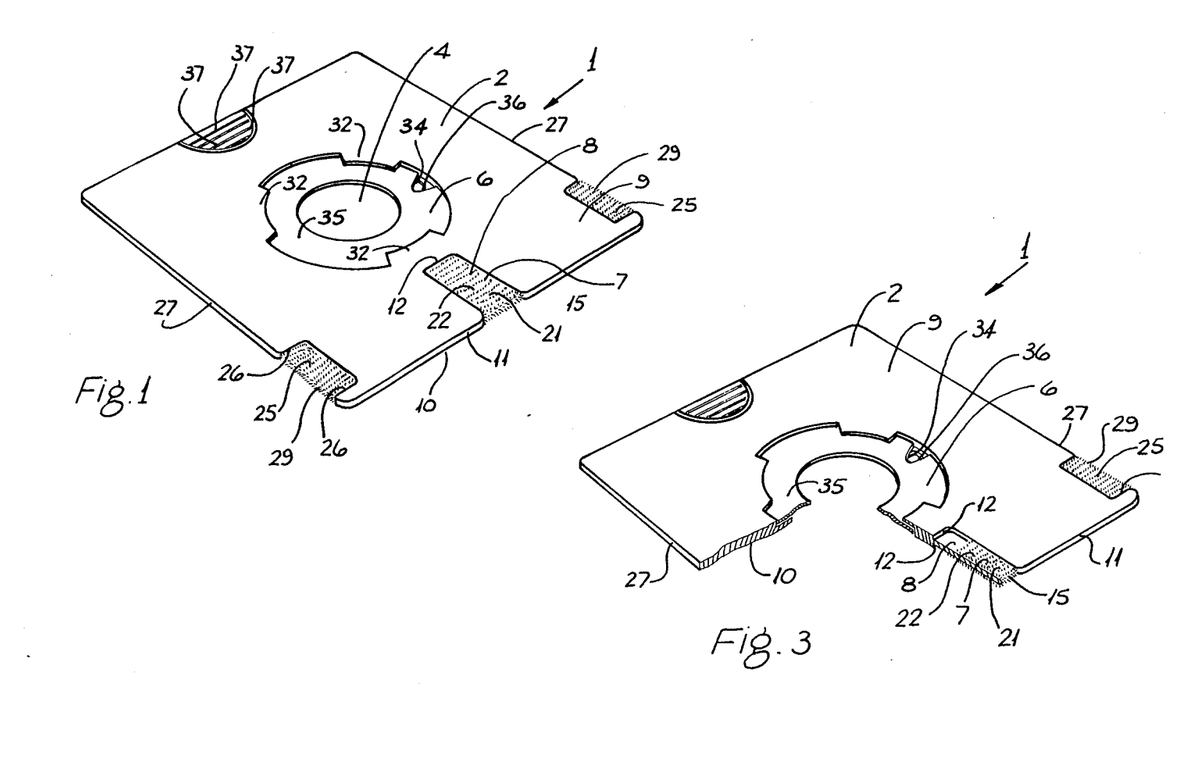
FIG. 1 is a perspective view of a cleaning device according to the invention.
FIG. 3 is a partly cut-away perspective view of the device of FIG. 1.
Figures 2, 4, 7:
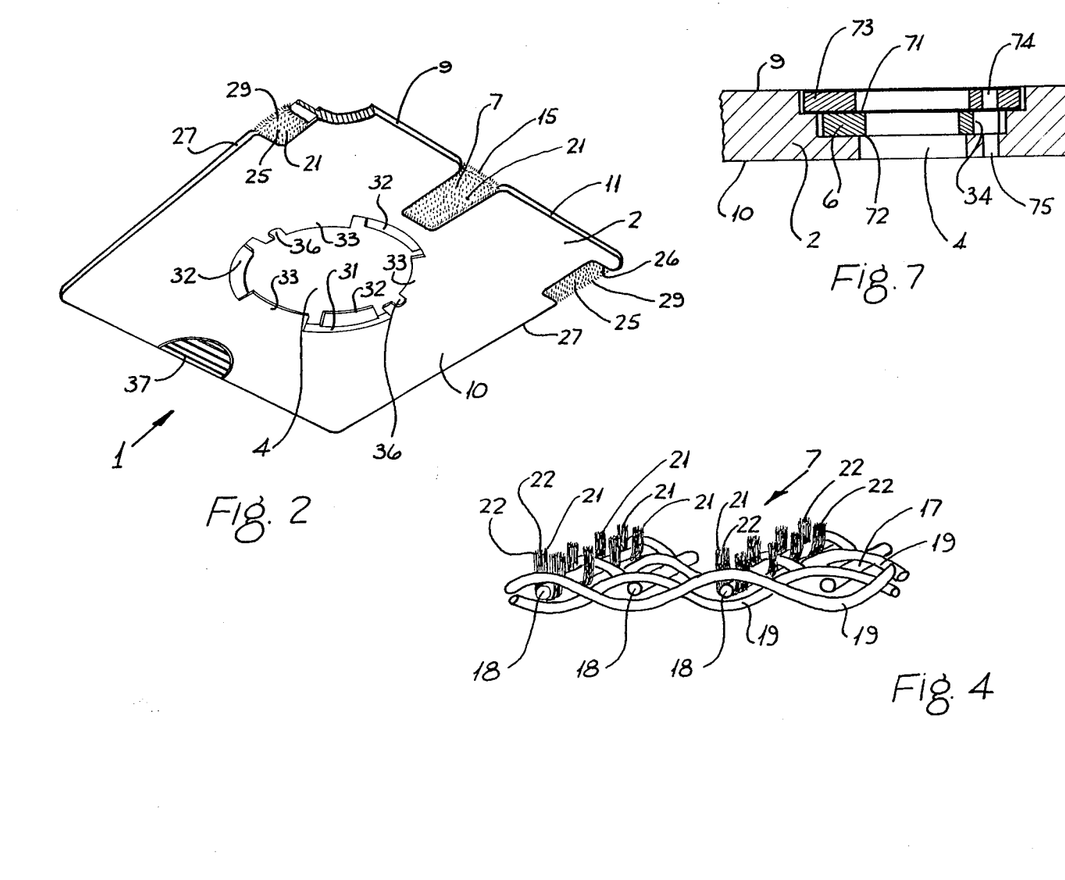
FIG. 2 is an underneath perspective view of the device of FIG. 1.
FIG. 4 is a perspective view of a detail of the device of FIG. 4.
FIG. 7 is a cross-sectional view of portion of the device of FIG. 5 on the lines VII—VII of FIG. 5.

Cleaning means for cleaning the read/write head is provided by a cleaning member 7 which is mounted on recesses 8 on each surface 9 and 10 of the plate member 2. As can be seen, the recesses 8 extend radially from adjacent the opening 4 to an end edge 11. The cleaning member 7 extends continuously from an end 12 of one recess 8 to the corresponding end 12 of the other recess. Portion 15 of the end edge 11 of the plate member 2 is relieved to accommodate the cleaning member 7. The cleaning member 7 comprises a backing material 17 of woven nylon threads 18 and 19. A plurality of tufts 21 each comprising a plurality of fibres 22 of nylon threads type.PA 6.6 are woven into the backing material 17 as illustrated in FIG. 4. A pair of tufts 21 are formed by bending and securing the fibres 22 around the threads 18. This can clearly be seen in FIG. 4. In this case, each tuft 21 comprises 68 fibres. The fibres are of 1.25 mm long and 19 microns in diameter. There are 298 tufts per $cm^2$ of the backing material 17. The backing material 17 is secured to the plate member 2 in the recesses 8 by a self-adhesive backing.

Guide rail cleaning means are provided by cleaning members 25 similar to the cleaning member 7 which are mounted in recesses 26 on each surface 9 and 10 of the plate member 2 adjacent the side edges 27 thereof. Each cleaning member 25 extends from the recess 26 on one surface 9 to the corresponding recess 26 on the other surface 10. Portions 29 are relieved at the side edges 27 to accommodate the cleaning members 25.

Returning now to the opening 4 and the rotatable annular disc 6, the annular disc 6 is rotatable in an annular type recess 31 formed in the opening 4 by staggered lugs 32 and 33 which extend from the plate member 2 into the opening 4. By their staggered configuration, the lugs 32 and 33 effectively define the recess 31 within which the annular disc 6 is rotatable. The disc 6 is of a relatively flexible material of similar flexibility and stiffness to a standard floppy disc. Portion 35 of the disc 6 extends into the opening 4 for engagement, in use, by the drive spindle of the disc drive unit. Accordingly, when the device 1 engages the floppy disc receiving area of the disc drive unit, the disc drive engages the annular disc 6 and in turn rotates it. An opening formed by a slot 34 in the annular disc 6 is provided to enable a light source in the floppy disc drive unit to fall on a light sensor also in the disc drive unit. This slot 34 corresponds to the normal opening in a floppy disc which is provided to indicate to the control mechanism of the disc drive unit that the floppy disc is rotating. Corresponding slots 36 are provided in the lugs 33. The slots are provided in positions where holes would normally be provided in a conventional floppy disc envelope.

Accordingly, as the annular disc 6 rotates, the light beam will be intermittently interrupted, thereby indicating to the device that the disc is rotating. Once this occurs, under suitable software control described below the read/write head travels radially outwardly of the opening 4 along a path defined by the cleaning members 7 and accordingly is brought in contact with the cleaning member. Thus, as the read/write head travels across the cleaning member 7, cleaning is effected.

A plurality of shallow grooves 37 are provided on each surface 9 and 10 of the plate member 2 to form a thumb grip for ease of insertion and removal of the device 1 from the floppy disc receiving area.

In use, the device 1 is entered in the floppy disc receiving area of the disc drive unit. As the plate member 2 is being inserted in the receiving area the movement of the plate member 2 into the area causes the cleaning members 25 to pass over the guide rails, thereby cleaning them. When the device 1 is fully inserted in the floppy disc receiving area, the drive spindle engages the annular disc 6. The disc 6 is rotated thereby intermittently interrupting the light beam within the disc drive unit indicating to the disc drive unit that the disc is rotating. On this occurring, under the software control the read/write head is brought into contact with the cleaning member 7 and traverses outwardly from the opening 4 to the end edge 11 and returns to the opening, thereby cleaning the head. This operation may be repeated a number of times if desired.

By virtue of the fact that a cleaning member has been provided on both surfaces 9 and 10 and also cleaning members 25 have been provided on both surfaces 9 and 10, the cleaning device is reversible. Further, in disc drive units in which read/write heads are provided top and bottom at both sides of the receiving area, the cleaning member 7 simultaneously cleans both read/write heads.

In certain cases it may be desirable to apply a cleaning fluid to the cleaning members 7 and 25, and any suitable cleaning fluid may be used. The fluid may be applied as drops onto the cleaning members 7 or 25, or by spraying or by dispensing from a felt type dispenser. After a certain amount of use, when the cleaning members 7 and 25 become soiled, they can readily easily be cleaned by washing, such as, for example, by immersing the device in water and cleaning with either water or water and a solvent solution, such as, for example, soap. The device 1 is then dried and is ready for use again.

In fact, one of the advantages of using fibres of nylon material and further by weaving the fibres in tufts into the backing material which is also of nylon provides a device that can readily easily be washed.

It has been found that by virtue of the fact that the cleaning member 7 comprises a plurality of upstanding fibres, relatively adequate cleaning of the read/write head is achieved. In particular, slots, grooves and the like in the read/write head are cleaned. This is accomplished by virtue of the fact that the fibres can bend and flex to extend into the slots and grooves of the read/write head. Further, by virtue of the fact that the fibres are provided in a plurality of tufts, it has been found that even more effective cleaning is achieved. The fact that the fibres are provided in a plurality of tufts facilitates in retaining the fibres upstanding while at the same time allowing them to bend and flex during the cleaning process.

While a specific range of length and diameters of fibres have been described, any length and diameters could be used. Although, in tests, it has been found that fibres of length in a range between 1.0 to 2.1 mm and diameters in a range between 15 and 25 microns provide particularly effective and efficient cleaning. Additionally, any suitable arrangement of the tufts and fibres could be provided. While specific numbers of tufts per sq. cm. and specific numbers of fibres per tuft have been described, other arrangements could be provided. Indeed, it has been found that efficient cleaning is obtained by providing tufts with between 50 and 75 fibres and providing between 250 and 350 tufts per sq. cm.

Similarly, by virtue of the fact that the guide rail cleaning members 25 are also provided by a plurality of fibres in tufts extending upwardly from a backing member, relatively effective cleaning of the guide rail is also achieved. However, it will be appreciated that other suitable cleaning members could be effective in cleaning the guide rails. Needless to say, other suitable cleaning means could also be used for cleaning the read/write head.

Figure 8:
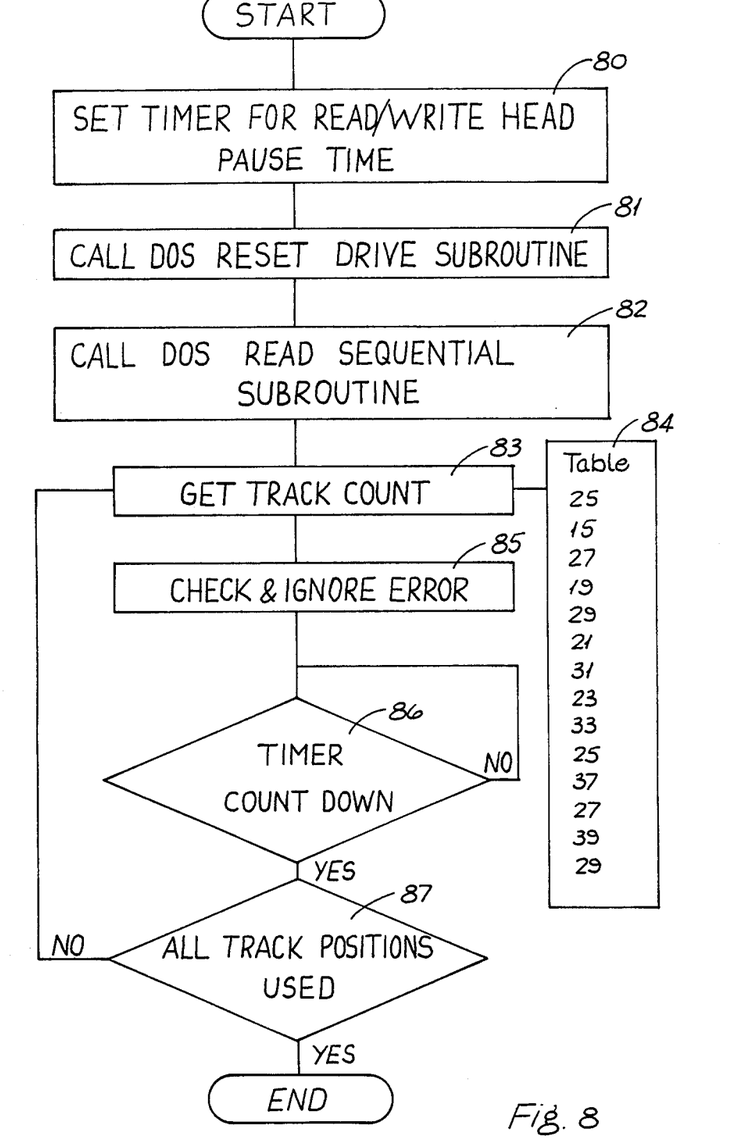
FIG. 8 is a flow chart of a computer programme for use with the cleaning device.

Referring now to FIG. 8 a flowchart of a computer programme which controls the read/write head of the disk drive during cleaning is illustrated. In general, it is expected that the computer programme will be provided on a floppy disc which will be sold along with the cleaning device 1. The computer programme will be loaded into the computer prior to inserting the cleaning device 1. On the cleaning device being inserted the computer programme controls the operation of the read/write head so that it traverses backwards and forwards over the cleaning member 7 of the cleaning device 1.

Dealing now with the flowchart, block 80 sets a countdown timer which causes the read/write head to pause at the end of each movement. Block 81 calls up the appropriate subroutine in the disc operating system (DOS) to reset the disc drive thereby returning the read/write head to the outside track. Block 82 calls up the read sequential subroutine of the DOS. Block 83 selects from a table the first track position which the read/write head is to proceed to. Block 84 illustrates a typical table. Needless to say any sequence of tracks could be selected. Block 83 takes the first count first which in this case is track 25 and under block 82 the read/write head is moved to track 25. Since the read/write head will be in continuous contact with the cleaning member 7 as the read/write head moves from track 0 to track 25 cleaning commences. Block 85 instructs the DOS to ignore the error reading which the read/write head will give when it reaches the position of block 25. Block 86 initiates the timer to time down on the read/write head on reaching the position of track 25. When the counter of block 86 returns to 0 the programme goes to block 87. Block 87 checks if the read/write head has gone to all track positions of the table of block 84. If not the programme returns to block 83 to get the next track count from block 84. When the read/write head has gone to all the track positions of block 74 the programme ends the cleaning device is then removed and the read/write head cleaned.

Figures 5, 6:
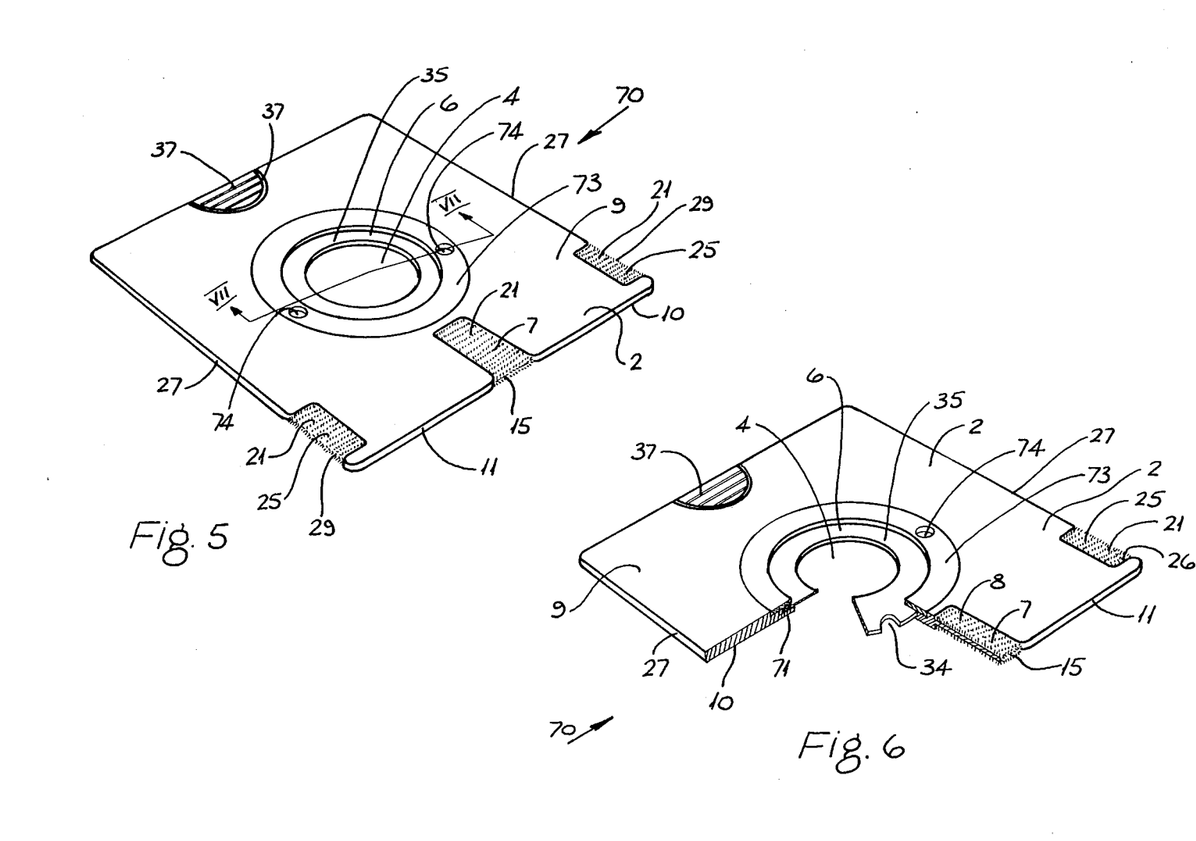
FIG. 5 is a perspective view of a cleaning device according to another embodiment of the invention.
FIG. 6 is a partly cut-away perspective view of the device of FIG. 5.

Referring now to FIGS. 5 to 7 there is illustrated a cleaning device 70 according to another embodiment of the invention, also for cleaning the read/write head of a floppy disc drive unit. This device 70 is substantially similar to the device 1 and similar components are identified by the same reference numeral. The main difference between this device 70 and the device 1 is in the mounting of the rotatable annular disc 6. In this case, an annular groove 71 is formed by a recess 72 in the plate member 2. An annular cover 73 recessed into the plate member 2 closes the recess 72 to form the groove 71. A pair of holes 74 and 75 through the cover 73 and plate member 2 respectively are provided to allow the rotation detection light means of the disc drive unit to pass through to the light sensor. Otherwise, operation of this device is similar to the device 1 of FIGS. 1 to 4.

While the cleaning members 7 and 25 have been provided on both sides of the plate member, this while in many cases is preferable, is not essential to the invention. In certain cases, the cleaning members may only be provided on one side. In such cases, the cleaning device would not be reversible, and where guide rails were provided above and below the floppy disc receiving area, the cleaning device would have to be inserted both right way up and upside down to clean both pairs of rails. Further, where two read/write heads are provided, one above and one below the floppy disc receiving area, the device would similarly have to be inserted right way up and upside down to clean both heads.

It is envisaged that in certain cases to save material, considerable portions of the plate member may be removed. For example, in certain cases, it is envisaged that a plate member in the form of a framework could be provided which would effectively define portion of the outer peripheral dimensions of a floppy disc envelope, and would provide a mounting arrangement for the annular rotatable member and mounting arrangements for the cleaning members 7 and 25. Indeed, in certain cases, it is envisaged that the cleaning members 25 may be dispensed with altogether.

It is further envisaged in certain cases that the rotatable annular disc may also be dispensed with, in which case suitable software could be provided to override the appropriate DOS control of the read/write unit.

It is also envisaged in certain cases that the cleaning member or members may be removable and replaceable by fresh cleaning members. For example, it is envisaged that cleaning members with a self-adhesive backing may be provided, which can be secured to the plate member and on wear or becoming soiled, could be removed and replaced by a fresh self-adhesive cleaning member or members. It is also envisaged in certain cases that a device could be provided with a plurality of cleaning members 7 and 25 as the case may be, one on top of the other, so that as one becomes soiled, it may be removed, thereby exposing the next.

Further, it is envisaged in certain cases that the cleaning members may be mounted directly on the surface of the plate member, instead of being mounted in recesses. In such cases, it is envisaged that the thickness of the plate member may be reduced.

It is envisaged that while the cleaning device has been described for cleaning the read/write head of a floppy disc drive unit, it could be used for cleaning any other component in any floppy disc drive unit, or indeed, in any other disc drive unit. For example, by suitably shaping the device, it could be used for cleaning components in a compact disc drive unit, such as for example the read head in a compact disc drive unit.

It will also be appreciated that by appropriately shaping the device, it could be used for cleaning components in a tape cassette player/recorder or an audio cassette player/recorder or any other audio or video or data player/recorder. In fact, in certain cases, it is envisaged that a cleaning device in the form of a plate member or alternatively in the form of a cassette similar to the tape cassette of an audio or video player/recorder unit could be provided with guide rail cleaners for cleaning guide rails in such devices. Indeed, in such cases it will be appreciated that the cleaning means for the read/write head could be dispensed with and other suitable or appropriate cleaning means may or may not, as desired, be provided in the cassette or mounted on the plate member for cleaning other components in the audio or video cassette type player/recorder unit.

Furthermore, while the plate member has been described as being of plastics material, it could be of any other suitable material, and where it is of plastics material, it is not essential that it should be injection moulded. It may be formed of any other suitable process. Furthermore, the annular disc could be of any other material besides that described.

While the carrier member of the cleaning device has been described as being in the form of a plate member, it could be of any other shape or construction. For example, in certain cases, it may be envisaged that it may be in the form of an envelope similar to a standard floppy disc envelope, or of any other shape or construction. Where it is of envelope construction, it is envisaged that the cleaning means which would be provided by a plurality of upstanding fibres extending upwardly from a backing member or otherwise, either in tufts or individually, the backing member may be mounted on the surface of the envelope, or alternatively, within the envelope, and a window may be provided in the envelope to provide access to the cleaning member.

Needless to say, while the cleaning members have been described as comprising fibres extending upwardly from a woven backing member, this is not necessary. The fibres could extend from any suitable backing member, either in tufts or not, and in certain cases may be provided on a backing member by flocking. Indeed, in certain cases, it is envisaged that the fibres may be mounted directly onto the carrier member, the plate member or in a recess on the plate member by a flocking process.

While particular lengths and diameters of fibres have been described, and while a particular range of lengths and diameters have been suggested in the specification for providing optimum results, other lengths and diameters could be provided without departing from the scope of the invention. Such lengths and diameters may not provide optimum results, nonetheless, they would provided adequate results. Similarly, tufts with numbers of fibres outside the preferred range could be provided without departing from the scope of the invention, as could the number of tufts per square cm be varied outside the preferred range. While such numbers of fibres in the tufts and such numbers of tufts may not altogether provide optimum results, they would, nonetheless provided adequate results.

Further it will be appreciated that other constructions of annular groove or arrangement of lugs to define an annular groove for rotatably supporting the annular disc may be provided without departing from the scope of the invention.

It will also be appreciated that while a particular computer programme flowchart has been described for controlling the cleaning device, any other suitable flowchart could be used without departing from the scope of the invention. Further, it will be appreciated that the read/write head could be controlled to move from the outer to the inner track over the cleaning member 7 for a number of times rather than following the path described in the flowchart of FIG. 8. Indeed, it is envisaged that many other movements of the head could be used.

We claim:

1. A cleaning device for a read/write head or recording/playback head of a disc drive unit, the cleaning device comprising:
   a plate member for engagement in a disc receiving area of the disc drive unit, the plate member defining an outer periphery of substantially similar shape to an outer periphery of a disc envelope, and having a front surface and a rear surface, and
   cleaning means for cleaning the head mounted on at least one surface of the plate member.

2. A cleaning device as claimed in claim 1 in which the cleaning means is provided by a plurality of fibres extending outwardly relative to said at least one surface.

3. A cleaning device as claimed in claim 2 in which the fibres are woven into a backing material.

4. A cleaning device as claimed in claim 2 in which the fibres are provided in tufts.

5. A cleaning device as claimed in claim 1 in which the cleaning means is an elongated cleaning member extending inwardly from an edge of the outer periphery of the plate member to form a cleaning path for the head.

6. A cleaning device as claimed in claim 1 in which the plate member is of semi-rigid material.

7. A cleaning device for a read/write head or recording/playback head of a disc drive unit, the cleaning device comprising:
   a plate member for engagement in a disc receiving area of the disc drive unit, the plate member having a front surface and a rear surface, and
   cleaning means for cleaning the head mounted on at least one surface of the plate member, the cleaning means being provided by a plurality of fibres extending outwardly relative to said at least one surface, the fibres having a length in the range of 1.0 to 2.1 mm and having a diameter in the range of 15 to 25 microns.

8. A cleaning device for a read/write head or recording/playback head of a disc drive unit, the cleaning device comprising:
   a plate member for engagement in a disc receiving area of the disc drive unit, the plate member having a front surface and a rear surface, and
   cleaning means for cleaning the head mounted on at least one surface of the plate member, the cleaning means being provided by a plurality of fibres extending outwardly relative to said at least one surface of the plate member, the fibres being arranged in tufts, 250 to 350 tufts being provided per square centimetre, and each tuft comprising between 50 and 75 fibres.

9. A cleaning device for a read/write head or recording/playback head of a disc drive unit, the cleaning device comprising:
   a plate member for engagement in a disc receiving area of the disc drive unit, the plate member having a front surface and a rear surface, and having a recess extending into at least one of the surfaces, and
   cleaning means for cleaning the head mounted in the recess.

10. A cleaning device as claimed in claim 9 in which a recess to receive a cleaning means is provided on each surface of the plate member, each recess extending from an end edge of the plate member, the cleaning means extending from an inward end of the recess on one surface around the end edge to a corresponding inward end of the recess on the other surface.

11. A cleaning device for a read/write head or recording/playback head of a disc drive unit, the cleaning device comprising:
   a plate member for engagement in a disc receiving area of the disc drive unit, the plate member having a front surface and a rear surface and an opening extending through the plate member from the front surface to the rear surface to coincide, in use, with a drive spindle of the disc drive unit, and having an annular recess extending into the plate member from the opening,
   an annular disc rotatable in the annular recess of the opening through the plate member, the annular disc extending into the opening, and being engagable, in use, with the drive spindle of the disc drive unit, the annular disc having an opening to permit light to pass from a light source to a light sensor within the disc drive unit as the opening aligns with the source and sensor, and
   cleaning means for cleaning the head mounted on at least one surface of the plate member.

12. A cleaning device as claimed in claim 11 in which the annular recess is defined by a plurality of staggered lugs extending from the plate member into the opening of the plate member.

13. A cleaning device for a read/write head or recording/playback head of a disc drive unit, the cleaning device comprising:

a plate member for engagement in a disc receiving area of the disc drive unit, the plate member having a front surface and a rear surface, first cleaning means for cleaning the head mounted on at least one surface of the plate member, and second cleaning means mounted adjacent each side edge of the plate member for cleaning guide rails in the disc receiving area as the plate member is being engaged in the disc receiving area.

* * * * *